United States Patent Office 3,351,425
Patented Nov. 7, 1967

3,351,425
METHOD OF RECOVERING ZIRCONIUM
AND HAFNIUM
William H. Owens, Tullahoma, Tenn., assignor, by mesne assignments, to Pittsburgh, Plate Glass Company, Pittsburgh, Pa., a corporation of Pennsylvania
No Drawing. Continuation of application Ser. No. 93,872, Mar. 7, 1961. This application Mar. 17, 1966, Ser. No. 535,031
12 Claims. (Cl. 23—23)

ABSTRACT OF THE DISCLOSURE

Alkali metal salts of zirconium or hafnium containing silica are subjected to the treatment of a concentrated aqueous acid solution while the silica therein is in an undissolved, solid and substantially unhydrated state to dissolve the salt in the acid solution which is then recovered from the solid silica.

---

This application is a continuation of application Ser. No. 93,872, filed Mar. 7, 1961 and now abandoned.

This invention relates to a novel method of recovering zirconium and hafnium values from compounds or compositions containing these materials.

Silica and other impurities conventionally occur in nature with zirconium and hafnium. One of the more widely known zirconium ores is zircon, which has the composition $ZrO_2 \cdot SiO_2$ and which contains a small amount of hafnium, probably as $HfO_2 \cdot SiO_2$. Thus, this material contains approximately one mole of $SiO_2$ per mole of $ZrO_2$ and $HfO_2$. The ore may also be contaminated with additional silica which is present as ordinary silica sand and may contain small amounts of other impurities, such as oxide of titanium, iron, columbium, thorium, uranium or other heavy metals.

According to one of the processes which has been proposed for recovery of zirconium and hafnium from such ores, the ore is heated with an alkali metal hydroxide or an alkali metal carbonate at an elevated temperature sufficiently high to convert the silica to a water soluble phase and to produce an alkali metal zirconate. Thereafter, the resulting product is extracted with water to remove part of the silica, apparently in the form of a water soluble alkali metal silicate. The remaining solids, which contain a high concentration of water, essentially all of the zirconium, the residue of the silica (rarely in excess of about 30 percent thereof) and essentially all of the hafnium are treated with acid, such as sulfuric acid or like acid, to dissolve the zirconium and hafnium.

The silica is dispersed through the resulting solution in a very highly colloidal state. In this form, it is very slow to settle and has a definite tendency to gel, particularly when the solution is contacted with an organic solvent. Since zirconium frequently is separated from hafnium by solvent extraction, this is a very objectionable phenomenon.

This silica appears to be in the form of very fine silica particles, probably below 15 millimicrons in size, which are very highly hydrated. Silica of this character is either soluble in the aqueous solution or forms a relatively stable colloidal suspension. It tends to dry in the form of hard, flinty particles which resemble glass in character. In high enough concentrations, it can cause the entire solution to convert into a gel or jelly. This is particularly observed when the solution is subjected to extraction with organic solvents.

In order to deal with this problem, it has been proposed to digest the aqueous solution thus obtained with acid in certain high concentrations in order to precipitate the silica and to convert it to a more filterable form. While this can be done, the zirconium, during this treatment, has a tendency to convert to an insoluble form; consequently, some portion of the zirconium often becomes insoluble.

According to the present invention, many of the difficulties heretofore encountered may be minimized or even substantially eliminated. In the process herein contemplated, the alkali metal zirconate containing silica is subjected to the treatment of an aqueous acid solution while the silica in the zirconate in contact with or in association with the alkali metal zirconate is in undissolved or solid state. Preferably, this silica is substantially unhydrated.

Thus, it has been found, according to this invention, that if the silica in the alkali metal zirconate is in solid state and particularly if it is essentially unhydrated and undissolved, the alkali metal zirconate containing this silica can be contacted with acid under conditions such that the reaction mixture is acidic substantially throughout the entire period of reaction (or at least in the initial stages until the silica becomes permanently insoluble) and the silica is then converted to an insoluble, readily filterable form.

This silica is pulverulent in character as distinguished from gelatinous. The major portion thereof has a particle size of above about 15 millimicrons, much of it being in the form of flakes, flocs or relatively porous granules. As a consequence, the silica will rapidly separate from solution, can be readily filtered out of solution, and does not seriously tend to cause the solution to gel.

In the practice of the process herein contemplated, it is found important to maintain the concentration of acid high enough to hold the silica out of solution. Usually the acid concentration should be high enough to maintain the pH of the mixture below about one throughout substantially the entire period of reaction. Thus, for most purposes, the alkali metal zirconate is added to a pool of the acid, care being taken to insure that the pool is maintained acidic, the concentration of the pool generally being held above about 3 moles of acid per liter of solution.

Various acids (usually inorganic or mineral acids) which form water soluble zirconium salts preferably having a solubility in water or acid solution of at least 25 grams per liter may be used for this purpose. Typical acids which are suitable are: nitric acid, sulfuric acid, hydrochloric acid, hypochloric acid, perchloric acid, and the like. Organic acids, such as trichloroacetic acid, may be used but are more expensive. Especially useful is nitric acid because it produces a solution of zirconium nitrate and hafnium nitrate which can readily be extracted directly and without further processing for separation of the zirconium from the hafnium.

The initial water content of the reacting mixture is maintained low, usually below 5 percent and for most purposes not over about 0.5 to 1 percent by weight based upon the weight of the initial solids subjected to treatment. Thus, the frit produced by reacting zircon with alkali is reacted with the acid before it absorbs moisture in excess of 5 percent, preferably before it absorbs 0.5 to 1 percent by weight of moisture. In the acid reaction, the initial water content of both the frit and the acid is low. Of course, some water in addition to this initial water content is generated in the course of the reaction. Evolved water can be distilled off as formed if desired. Thus, the total water in the reaction mixture rarely exceeds 40 percent by weight and normally is so low that a large portion of alkali metal nitrate or other alkali metal salt formed by reaction of the acid with the alkali of the frit precipitates or crystallizes out of solution.

The process may be conducted in several ways. For example, the alkali metal zirconate frit which is produced by reaction of alkali metal hydroxide with zircon may be reacted directly with the acid without previous contact with water, i.e., in an essentially anhydrous state, to dissolve sodium silicate. Thus, the frit produced by reaction of alkali metal hydroxide with zircon substantially as described in U.S. Letters Patent No. 2,962,346, may be extracted directly with an inorganic acid, such as nitric acid, by feeding this frit either hot or cold to a pool of the nitric acid or like acid.

Usually, the temperature of the pool of acid should be high, above room temperature. For most purposes, the temperature of the pool should exceed 50° C. and advantageously the nitric or like acid may be at its boiling point. The rate of addition of the frit to the acid may be conveniently controlled to maintain this temperature by the heat of neutralization evolved upon addition of the frit to the nitric acid.

In the practice of this process, the frit is usually added to an acid of high concentration. For example, frit may be added to a boiling solution of nitric acid containing 40 to 60 percent by weight or more of $HNO_3$. In the course of addition, a portion of the nitric acid becomes neutralized. Usually, however, addition of frit is discontinued before the nitric acid concentration falls to about 30 percent by weight of the resulting aqueous solution.

The frit may be added to the nitric or like acid solution while it is hot and substantially at the temperature at which it is released from the reactor in which it is formed. Normally, the reaction of sodium hydroxide or like alkali metal hydroxide with zircon takes place at a temperature well above 300° C., usually in the range of 450–650° C. Thus, the frit produced in this reaction is usually at these temperatures or only slightly below. Thus frit may, without cooling, be introduced into the nitric acid. Alternatively, the frit may be cooled at any convenient temperature, for example, room temperature or above.

If the frit is allowed to cool, however, it will inevitably pick up a certain amount of moisture from the atmosphere. The amount of moisture which it will pick up will vary to a considerable degree, depending upon the atmospheric humidity and also upon the length of time it is allowed to stand. For most purposes, caution should be taken to avoid absorption of the water to cause a portion of the alkali metal silica zirconate in the frit to dissolve in water. This can be avoided if the temperature of the frit added to the acid is maintained above about 75 to 100° C.

As a consequence of the process herein contemplated, there is produced an aqueous solution of the zirconate salt of the acid, for example, zirconyl nitrate, in which there is dispersed precipitated silica and usually the precipitated alkali metal salt of the acid, such as sodium nitrate. This is particularly true for the acid solution is maintained strong enough to insure production of a solution having such a limited water content as to avoid dissolution of all of the evolved sodium salt, such as sodium nitrate.

The silica which is present in this solution can be filtered with extreme ease. A clear supernatant liquor containing zirconium nitrate or like zirconium salt can be decanted from a major portion of the silica and other suspended solids with relative ease.

Thus, the solution can be separated from the suspended solid by decantation and/or filtration. Residual liquor in contact with the resulting filter cake or thickened slurry of solids can be washed from the solid if desired or if necessary. However, this results in a dilution of the zirconium salt since the wash liquors are usually much more dilute than the initial solution. Recovery of the zirconium salts and/or the alkali metal salts from such washed liquors can be effected, but such recovery often is very expensive.

According to a further embodiment of this invention, it has been found that substantially complete removal of zirconium and/or hafnium in an aqueous solution containing suspended solids of this character (silica and/or alkali metal salts, such as sodium nitrate) can be achieved by extracting the solution and/or the slurry of suspended solids directly with an organic solvent, such as tributyl phosphate or like solvent which extracts zirconium. By this means, it has been discovered that the zirconium and/or halfnium may be substantially completely removed in the organic solvent leaving impurities, including silica as well as other metallic impurities, such as iron, tantalum, niobium, chromium, and the like, either dissolved or suspended in the aqueous solution. It is highly surprising that this process is feasible.

Thus, when an aqueous solution of zirconium salts, such as zirconium nitrate, containing dissolved silica or silica suspended in colloidal or hydrated form (such as has been produced by processes heretofore used) is extracted with tributyl phosphate, this solution normally converts to a gel, such as a solid or semi-solid. Little or no separation of organic solvent can be achieved. Even when the silica concentration is low, the silica component tends to concentrate at the interface between the organic solvent and the aqueous layer and to impair separation of the organic solvent from the aqueous phase. For this reason, it has been considered necessary to conduct extractions of this character in the substantial absence of silica. Rarely has it been considered feasible to conduct extraction of solutions in which the Si content exceeded about 0.1 percent by weight based upon the zirconium content of the solution.

In contrast, applicant has discovered surprisingly that if the silica is in a pulverulent form of the type produced and herein contemplated as distinguished from the gelatinous or colloidal form, the silica does not cause gelation of the resulting mixture upon extraction with organic solvents, such as tributyl phosphate, but on the contrary remains associated with the aqueous phase. Consequently, all or substantially all of the zirconium and hafnium content can be extracted into the organic phase with very little difficulty and without the dilution which is attendant to washing of filter cakes to recover dissolved zirconium entrapped therein.

This extraction can be conducted in a simple manner simply by mixing the solvent with the aqueous solution produced by reaction of the frit with the nitric acid as described above and separating the organic phase. If desired, this can be repeated one or two times in order to ensure complete removal of the zirconium from the solution. However, a single extraction usually is sufficient.

The amount of solvent can be readily controlled so as to cause extraction of substantially all of the zirconium and hafnium without extraction of the other metal impurities. The amount of solvent used, of course, is dependent to a large degree upon the concentration of zirconium and hafnium in the solution as well as the concentration of the impurities. It depends also upon the nature of the solvent. In like manner, the number of stages of extraction which is used determines to a large degree of the amount of solvent required. Thus, more solvent is required for a single stage of extraction which is resorted to than would be required where the extraction is conducted in a column where a plurality, say five or more stages of extraction, takes place. Generally about one volume of solvent per volume of aqueous medium is enough. However, the exact amount required can be determined readily by simple experimentation in which the weight ratio of impurities (metals other than hafnium and/or zirconium) to zirconium and hafnium in the non-aqueous phase is measured. If this ratio is not lower, preferably substantially lower, than the relative ratio of such impurities to zirconium and hafnium in the aqueous solution, the volume of solvent per volume of aqueous solution should be reduced until such a reduction in impurity in the concentration can be achieved.

The separation of the organic solvent (or organic phase) from the aqueous phase is especially effective when conducted in the presence of solid suspended alkali metal salt since, even when small amounts of gelatinous silica are present, the solid salt minimizes the tendency for the silica to collect at the interphase or to gel and, thus, separation of the organic from the aqueous phase is facilitated. Sodium nitrate or like salt which is crystallized from solution during the acid treatment of the frit is especially useful for this purpose.

Various solvents which form two liquid phases with water, i.e., are insoluble with water in some proportion and which extract the zirconium salt such as zirconyl nitrate can be used for this purpose, including those mentioned in U.S. Patent No. 2,753,250 granted to H. A. Wilhelm et al., July 3, 1956. Included are the liquid trialkyl phosphates, such as tributyl phosphate, tricresyl phosphate, trihexyl phosphate, trioctyl phosphate, oxidecyl hydrogen phosphate, dioctyl phenyl phosphate, didecyl phenyl phosphonate, dihexyl phenyl phosphate, butyl phenyl phosphonate, and the like. These solvents frequently are diluted with other materials including liquid hydrocarbon, such as hexane, n-heptane, n-octane, or the like. Ethers, such as diethyl ether, dibutyl ether, or ketones, such as diisobutyl ketone, mesityl oxide, diisopropyl ketone, or cyclohexanone or alcohols, such as secondary amyl alcohol or isoamyl alcohol or esters, such as isoamyl acetate or butyl acetate may be used.

The organic solvent solution of zirconium-hafnium salt thus obtained is obtained quite pure with respect to silica and other metallic components and may be used as such as a source for production of zirconium salt. For example, the zirconium salt may be crystallized or otherwise recovered from the organic solvent.

The organic solution of hafnium and zirconium can be effectively extracted with nitric acid in order to separate hafnium from zirconium. For example, it may be introduced into a central stage of a multistage extraction system such as a central area of a vertical extraction column in which a further portion of the organic solvent is fed into the column at or near the bottom thereof (one end of the system) and an aqueous acid, such as nitric acid, is fed into the upper portion of the column (the other end of the system), the nitric acid and the solvent being allowed to countercurrently contact and to extract the solution. By feeding the resulting organic solution of zirconium and hafnium into an intermediate point between the feed point of the nitric acid and the feed point of the organic solvent, it is possible to produce two fractions in the column, one of which is preponderantly of hafnium and the other preponderantly of zirconium. For example, when an alkyl phosphate, such as tributyl phosphate is used as the organic solvent, the zirconium is found to be largely or even substantially entirely in the tributyl phosphate leaving the top of the column, whereas the hafnium is found to be largely or substantially entirely in the aqueous nitric acid solution leaving the bottom of the column.

According to a further embodiment of the invention herein contemplated, the frit may be preliminarily extracted with water in order to remove a portion of the silica. In such a case, the residual solid contains a preponderant amount or substantially all of the alkali metal zirconate together with some portion, usually up to about 30 percent of the initial silica concentration of the frit.

If this wet alkali metal zirconate is contacted with acid, the silica either goes into the solution in a colloidal form or is present in such a finely divided hydrated state that it is extremely slow in filtering and does not separate readily upon settling.

According to this invention, it has been found, however, that if the water leached product thus obtained is dried adequately and then is added to the nitric acid under conditions such as to maintain the mixture acid as described above, the silica is precipitated in a rapidly filterable form which is pulverulent in character as distinguished from gelatinous.

The degree of drying of the leached frit or leached residue obtained on leaching frit is found to be important. In general, it is found necessary to dry this frit at a temperature above 300° C. (rarely over 600° C.). If temperatures below about 300° C. are resorted to, the silica which is obtained upon treatment of the residue with acid is highly colloidal and gels the solution when it is contacted with organic solvent. In contrast, if the residue is heated at a temperature above 600° C.–800° C., the zirconium content tends to become insoluble and a substantially reduced amount of zirconium goes into the solution upon treatment with acid.

The following examples are illustrative:

*Example I*

Alkali metal zirconate frit was prepared from zircon ore as follows:

The zircon sand used contained about 66 percent by weight of zirconium calculated as $ZrO_2$, 1.3 percent by weight of hafnium calculated as $HfO_2$, and 32 percent by weight of $SiO_2$. The zircon had a particle size below about 50 mesh. The zircon was fired with sodium hydroxide in an externally fired, rotating tube kiln 26 feet long and having an internal diameter of 3 feet. The kiln was heated to a temperature of about 1050 to 1150° F.

Dry zircon was fed to the kiln, at the entry end thereof, continuously at a rate of 6.5 pounds per minute. An aqueous solution containing about 50 percent by weight of NaOH was fed into the kiln through 8 sprays which were individually supplied by 8 tubes each ¼ inch in diameter from a common source of sodium hydroxide solution. The first spray was located at 5 feet from the feed end of the kiln and the other sprays were spaced two feet apart in a row downstream of the kiln from the first spray nozzle. These tubes were enclosed in a cooling tube 4 inches in diameter which thus provided a cooling jacket extending along the length of the kiln. The sprays delivered a downwardly directed flat spray extending longitudinally of the kiln, the angle of each spray being about 65 degrees, so that the sprays did not intersect.

The sodium hydroxide was introduced into the sprays at a total rate of about 1.3 gallons per minute, each spray being supplied with approximately an equal amount of sodium hydroxide solution. The temperature of the sodium hydroxide solution was held below the boiling point thereof by means of water circulating through the cooling jacket at a rate of about 10 gallons per minute. A dam ring was provided in the kiln to ensure provisions of a bed depth of about 2 to 5 inches of the reacting zircon, so that the caustic was largely consumed before it reached the kiln wall.

The alkali metal zirconate produced was withdrawn from the exit end of the kiln at a temperature of about 500° F. Approximately 90 percent by weight of the zirconium in the zircon introduced was converted to sodium zirconate.

Four hundred and fifty milliliters of nitric acid containing about 70 percent by weight of $HNO_3$ was placed in a flask equipped with a water-cooled reflux condenser and an inlet for adding frit. The flask was heated until the nitric acid began to boil and water began to condense in the condenser.

At this time 170 grams of the alkali metal zirconate frit prepared as above and cooled to room temperature under an anhydrous atmosphere was gradually added to the hot nitric acid, the rate of addition being sufficient to keep the nitric acid boiling but slow enough so that substantial foaming did not take place. The time of addition was about 10 minutes. After the addition was complete, the reaction mixture was held at boiling temperature and atmospheric pressure for about 30 minutes.

The resulting reaction mixture was a slurry of fine pulverulent silica and sodium nitrate crystals dispersed in the zirconium nitrate-hafnium nitrate solution and containing about 0.70 pound of dissolved Zr per gallon of slurry.

The resulting slurry was cooled to about 90° F. and was extracted with 1400 milliliters of solvent which was a mixture of 50 percent by volume of tributyl phosphate and 50 percent by volume of a liquid hydrocarbon which has a boiling point at 760 millimeters of pressure of 170° C. The resulting organic solvent solution contained 97 percent by weight of the zirconium, 95 percent by weight of the hafnium originally contained in the slurry and 10 percent by weight of $HNO_3$. No gelation of the solvent due to the presence of silica took place.

*Example II*

The frit prepared according to Example I was leached with water. When dried in an oven which was heated to 140° C., constant weight, the material contained 46.4 percent of acid soluble zirconium, 8.64 percent of $SiO_2$ and 14.88 percent of $Na_2O$.

In a series of tests, 20 gram portions of the dried cake were calcined for one hour at the temperatures indicated in Table I. The dried cake was then dumped while hot into 130 milliliters of nitric acid heating under reflux as in Example I. The initial concentration of the nitric acid was 60–70 percent by weight. The resulting mixture was boiled for 15 minutes after the cake was added.

These experiments were run in duplicate. One of each duplicate was filtered and the cake washed with a minimum amount of water. The other duplicate was cooled and then extracted with 400 milliliters of the tributyl phosphate-hydrocarbon solvent described in Example I.

The recovery of zirconium in the first instance was calculated from the parts by weight of zirconium in the filtrate per hundred parts by weight of total zirconium in the sample. Insoluble zirconium was computed by difference. The silica in the filtrate was measured. The results are shown in Table I.

In the second series of tests, where the solutions were extracted with solvent, the amount of zirconium extracted into the solvent was computed, the amount dissolved in aqueous solution being determined by analysis. Table II reports the results obtained, the percent soluble zirconium in the solvent being computed on the basis of the amount of zirconium dissolved in the nitric acid and the percent of total zirconium in the solvent being based upon the amount of zirconium initially in the sample.

The results were as follows:

TABLE I

| Temperature of Drying, °C. | Percent Soluble Zirconium in Filtrate | Percent Insoluble Zirconium | Pounds of Silicon per 100 lbs. of Zirconium in Filtrate |
| --- | --- | --- | --- |
| 900 | 39.8 | 60.2 | 0.11 |
| 700 | 31.7 | 68.3 | 0.11 |
| 650 | 52.2 | 47.8 | 0.09 |
| 600 | 64.4 | 35.6 | 0.06 |
| 500 | 93.95 | 6.05 | 0.32 |
| 300 | 95.8 | 4.2 | 0.82 |
| 140 | 93.4 | 6.6 | 0.29 |

TABLE II

| Temperature of Drying, °C. | Percent Soluble Zirconium in Solvent | Percent Total Zirconium in Solvent |
| --- | --- | --- |
| 900 | 99.9 | 45.0 |
| 700 | 98.3 | 31.9 |
| 650 | 86.2 | 45.0 |
| 600 | 86.3 | 55.6 |
| 500 | 93.6 | 85.4 |
| 300 | (¹) | ------- |

¹ Gelled completely.

It will be seen, from the above tests, that products which were dried at temperatures as low as 300° C. gelled completely. In contrast, a good separation of the two liquid phases and high recovery was achieved when the temperature of calcination was from 500°–650° C. Even better recovery could have been achieved with a multi-stage extraction. On the other hand, calcination of temperatures above about 600° C. resulted in reduction of solubility in a portion of the zirconium.

Zirconium is preferentially extracted or retained by the tributyl phosphate plus diluent phase. The zirconium in an organic solution provided according to Example I may be preferentially extracted. To demonstrate this, solvent feed as produced according to Example I was subjected to a laboratory separation-extraction as described in Example III.

*Example III*

This involved a shakeout embodying the principles of a normal countercurrent separation-extraction process. Three stages, provided by separatory funnels for mixing until phase equilibrium was reached, were employed. These stages included a feed stage with one stage of scrubbing and one stage of extraction. Thus, by using a dilute nitric acid as scrub, the hafnium was preferentially scrubbed from the solvent in the scrub stage and solvent containing no metal was used to preferentially extract zirconium in the extraction stage. Arbitrary volume ratios of 10:2:1 of solvent feed to scrub nitric acid to extraction solvent were used.

Organic solvent feed produced according to Example I containing 0.286 pound per gallon of zirconium plus hafnium and 1.3 pound per gallon of nitric acid was employed. The hafnium and zirconium were present in the weight ratio of 2.2 parts hafnium per 100 parts zirconium. The scrub solution was 4.75 N nitric acid and the extraction solvent was pre-equilibrated with nitric acid to contain 1.0 pound of nitric acid per gallon of solvent.

After approximate equilibrium was reached, the organic phase in the scrub section contained 0.28 pound per gallon zirconium plus hafnium that analyzed by weight 1.3 parts hafnium per 100 parts zirconium. This was a 41 percent reduction of the hafnium in one scrub stage. The aqueous raffinate after one stage of extraction contained 0.006 pound per gallon zirconium plus hafnium that analyzed by weight 66 parts hafnium per 100 parts zirconium. This was a 30 fold enrichment of the hafnium after one stage of extraction.

This procedure was repeated except the scrub acid was 2 N nitric acid. The organic phase in the scrub stage contained 0.04 pound per gallon zirconium plus hafnium that analyzed by weight 87 parts hafnium per million parts zirconium. This met the hafnium specification for reactor grade zirconium which is 100 p.p.m. hafnium maximum. Although the zirconium recovery was not optimum due to overscrubbing by the dilute nitric acid, these results illustrate that, with proper adjustment of volume ratios and scrub acid normality, solvent feed (provided by Example I) can be used effectively as feed to the column described in column 5 for the separation of hafnium and zirconium. The resulting hafnium raffinate would be relatively clean and could readily be processed to recover the hafnium value.

With aqueous feed there is always a chance for silica and other solids to accumulate at the interface between the solvent and aqueous phases, even when both streams are free of solids before contacting. This phenomenon interferes with extraction operations and eventually leads to upsets. By use of organic feeds such as provided by Example I, these problems do not arise or are effectively minimized as attested by the fact that the phase separations were fast and clean throughout all the laboratory tests.

While one preferred embodiment of the invention has been given above, numerous modifications thereof may be practiced without departing from the spirit of the invention. For example, other organic extractants, such as alkyl phosphates and acetates, can be utilized as described in U.S. Patent No. 2,757,081. Numerous diluents, such as many petroleum fractions containing aromatics or straight-chain hydrocarbons, can be employed, depending upon the particular conditions under which this column is to be operated. In general, it is desired that the diluent give a maximum difference between the specific gravity of the organic and aqueous phases without unduly complicating the operation of the column from safety, degradation or other consideration. It is not necessary that the organic phase be lighter than the aqueous phase but only that they separate readily by gravity. Numerous specific diluents are hydrocarbons, such as hexane, n-heptane, n-octane, the n-alkanes with twelve, thirteen or fourteen carbon atoms, and methylcyclohexane and carbon tetrachloride have also given good results. A diluent, which also has been successfully used, is a naphtha having a specific gravity of 0.75, a boiling point of 167°–180° F. and a flash point of 120° F. It is sold under the trade name "Varsol." A mixture of any of the diluents enumerated above may also be used.

While the invention has been described by reference to specific details of certain embodiments, it is not intended that the invention be construed as limited to such details, except insofar as they appear in the claims.

What is claimed is:

1. A method of separating silica from zirconium in an alkali metal zirconate containing said silica which comprises adding alkali metal zirconate while the silica is in essentially unhydrated undissolved state to a pool of aqueous concentrated acid containing enough acid to dissolve the zirconium of the zirconate and form an aqueous solution thereof, maintaining the acid concentration in said pool high enough to maintain the pH of the pool below about 1 throughout substantially the entire period of alkali metal zirconate addition whereby to hold silica out of solution and produce a slurry of solid silica in said aqueous zirconium solution and separating the solid silica from the zirconium solution.

2. The method of claim 1 wherein the separation of solid silica from aqueous zirconium solution involves extracting the slurry with a water immiscible organic solvent for the zirconium.

3. The process of claim 1 wherein the acid is nitric acid and the alkali metal is sodium.

4. The method of claim 1 wherein the water content of said pool is maintained low enough such that the resulting slurry of silica in aqueous zirconium solution contains solid alkali metal salt of the acid.

5. The method of claim 1 wherein the acid concentration of the pool is above 3 moles of acid per liter of solution.

6. A method of separating silica and zirconium in a frit produced by reaction of zircon and alkali which frit contains alkali metal zirconate and said silica which comprises adding frit containing no more than 5 percent absorbed water and while the silica is in an essentially unhydrated solid state to a pool of aqueous nitric acid containing at least 40 percent by weight of $HNO_3$ to dissolve the zirconium of the zirconate and form an aqueous zirconium solution, maintaining the acid concentration throughout the addition above about 30 percent by weight $HNO_3$ whereby to hold silica out of solution and produce a slurry of solid silica in said aqueous zirconium solution, and separating undissolved silica of the slurry from the aqueous zirconium solution.

7. The method of claim 6 wherein the water content of the pool is maintained below about 40 percent by weight and wherein a large portion to the alkali metal salt formed by reaction of the acid with the alkali precipitates out of solution.

8. A method of separating silica from zirconium in an alkali metal zirconate which contains alkali metal silicate comprising extracting a portion of the alkali metal silicate from the alkali metal zirconate with water to provide a water leached residue, heating said residue above 300° C. and below 600° C. until its silica content is converted to an essentially unhydrated, undissolved state while maintaining zirconium in the residue soluble in concentrated aqueous acid, contacting the so heated residue with concentrated aqueous acid to dissolve the zirconium of the zirconate and form an aqueous solution thereof while maintaining the concentration of said acid solution at a pH of below about 1 throughout substantially the entire period of alkali metal zirconate addition to maintain the silica in the treated residue in a substantially insoluble state therein to provide an aqueous solution of zirconium containing pulverulent, readily filterable silica and separating the resulting solution from said pulverulent silica.

9. The method of claim 8 wherein the concentration of aqueous acid is above 3 moles of acid per liter of solution.

10. The method of claim 8 wherein the alkali metal is sodium and the acid is nitric.

11. The method of claim 8 wherein the acid is nitric and the so heated residue is added to a pool of aqueous concentrated nitric acid while the nitric acid concentration is maintained high enough to maintain the pH of the pool below about 1 throughout substantially the entire period of residue addition to dissolve the zirconium of the zirconate and form an aqueous solution thereof containing readily filterable pulverulent silica.

12. The method of claim 8 wherein the aqueous zirconium solution is extracted with a water immiscible solvent for the zirconium thereby to separate zirconium from said silica.

References Cited

UNITED STATES PATENTS

| | | | |
|---|---|---|---|
| 2,227,833 | 1/1941 | Hixson et al. | 23—23 |
| 2,741,628 | 4/1956 | Plucknett | 23—312 X |

OTHER REFERENCES

Beyer et al. "U.S. Atomic Energy Commission Report, ISC 437 (Rev.), Aug. 17, 1954, 15 pages (pages 12 to 14 particularly relied on).

OSCAR R. VERTIZ, *Primary Examiner.*

H. T. CARTER, *Assistant Examiner.*